United States Patent
Xu et al.

(10) Patent No.: US 8,923,697 B2
(45) Date of Patent: Dec. 30, 2014

(54) LONG REACH OPTICAL AMPLIFICATION DEVICE, PASSIVE OPTICAL NETWORK, AND METHOD FOR TRANSMITTING OPTICAL SIGNALS

(75) Inventors: Jidong Xu, Shenzhen (CN); Dezhi Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 169 days.

(21) Appl. No.: 13/695,325

(22) PCT Filed: Dec. 30, 2010

(86) PCT No.: PCT/CN2010/080507
§ 371 (c)(1),
(2), (4) Date: Oct. 30, 2012

(87) PCT Pub. No.: WO2011/134269
PCT Pub. Date: Nov. 3, 2011

(65) Prior Publication Data
US 2013/0044368 A1    Feb. 21, 2013

(30) Foreign Application Priority Data
Apr. 30, 2010    (CN) .......................... 2010 1 0174883

(51) Int. Cl.
*H04B 10/297*    (2013.01)
(52) U.S. Cl.
CPC ................................. *H04B 10/2972* (2013.01)
USPC .............................. 398/67; 398/177; 398/180
(58) Field of Classification Search
CPC .................................................... H04B 10/2972
USPC .......................... 398/67, 177, 180; 359/341.2
See application file for complete search history.

(56) References Cited

U.S. PATENT DOCUMENTS 5,280,549 A *   1/1994   Barnard et al. ................. 385/15
5,500,763 A *   3/1996   Ota .................................. 359/333

(Continued)

FOREIGN PATENT DOCUMENTS

| CN | 1170286 A | 1/1998 |
| CN | 101478701 A | 7/2009 |
| CN | 101630979 A | 1/2010 |

OTHER PUBLICATIONS

P.R. China, State Intellectual Property Office, International Search Report for International Application No. PCT/CN2010/080507, mailed Apr. 7, 2011.

*Primary Examiner* — Ari M Diacou
(74) *Attorney, Agent, or Firm* — Bright IP Law Offices

(57) ABSTRACT

The present invention provides a long reach optical amplification device, a passive optical network and an optical signal transmission method in the communication field. The long reach optical amplification device comprises: a first optical diplexer, configured to transmit one or multiple downlink optical signal(s) from a first segment of Feeder fiber to a downlink optical amplifier; and to couple one or multiple uplink optical signal(s) amplified by a uplink optical amplifier to the first segment of Feeder fiber; the downlink optical amplifier, configured to amplify the downlink optical signal(s) and to output the amplified one or multiple downlink optical signal(s); a second optical diplexer, configured to couple the downlink optical signal(s) amplified by the downlink optical amplifier to the second segment of Feeder fiber, and to transmit the uplink optical signal(s) from the second segment of Feeder fiber to the uplink optical amplifier; and the uplink optical amplifier, configured to amplify the uplink optical signal(s) and to output the amplified uplink optical signal(s). The present invention resolves the long reach coexistence of several PON systems.

8 Claims, 6 Drawing Sheets

(56) References Cited

U.S. PATENT DOCUMENTS

| | | | |
|---|---|---|---|
| 5,502,589 A * | 3/1996 | Yamamoto et al. | 398/180 |
| 5,604,627 A * | 2/1997 | Kohn | 359/341.2 |
| 6,392,790 B1 * | 5/2002 | Lauder et al. | 359/341.2 |
| 6,400,864 B1 * | 6/2002 | Lee | 385/24 |
| 6,493,133 B1 * | 12/2002 | Liang et al. | 359/349 |
| 6,728,027 B2 * | 4/2004 | Rapp | 359/341.2 |
| 6,751,414 B1 * | 6/2004 | Davies et al. | 398/41 |
| 2001/0019449 A1 * | 9/2001 | Krummrich | 359/341.2 |
| 2002/0021166 A1 * | 2/2002 | Rapp | 330/4.5 |
| 2004/0037568 A1 * | 2/2004 | Evangelides, Jr. | 398/159 |
| 2004/0096223 A1 * | 5/2004 | Evangelides et al. | 398/147 |
| 2009/0110398 A1 | 4/2009 | Pfeiffer | |
| 2013/0057948 A1 * | 3/2013 | Simonneau et al. | 359/341.2 |

\* cited by examiner

LONG REACH OPTICAL AMPLIFICATION DEVICE, PASSIVE OPTICAL NETWORK, AND METHOD FOR TRANSMITTING OPTICAL SIGNALS

FIELD OF THE INVENTION

The present invention relates to the communication field, and in particular to a long reach optical amplification device, a passive optical network, and a method for transmitting optical signals.

BACKGROUND OF THE INVENTION

The rapid development of the wired broadband access technology and the requirements of low costs make the optical fiber gradually replace the currently as copper wire (wired) system, i.e., optical in copper out to be a trend. Since the passive optical network (PON) has the properties of being widest, most rapid, and most environment friendly, and the long reach passive optical network can flatten and simplify the network structure and adapt to those network structures with relatively long distance and the investment costs thereof are reduced, most operators accept it and start to or prepare to deploy it so as to meet the increasing communication users and more rapid and better service demands.

Long reach passive optical network is a point-to-multipoint fiber access technology, and as shown in FIG. 1, it includes an optical line termination (OLT), an optical network unit (ONU), an optical distribution network (ODN), etc. Usually, long reach passive optical network is a point-to-multipoint structure composed of one OLT connecting to a plurality of ONUs by way of an optical power separator (abbreviated as optical splitter) and a reach extender box (REB) at the ODN.

Regarding the investment costs and the multiplexing feature of the ODN, a plurality of PON systems may share the same ODN in the passive optical network. As shown in FIG. 2, different PON systems usually have different uplink/downlink wavelengths, for example, the downlink wavelength of GPON is 1480 nm-1500 nm, and the uplink wavelength thereof is 1290 nm-1330 nm, while the downlink wavelength of XG-PON1 is 1575 nm-1580 nm, and the uplink wavelength, thereof is 1260 nm-1280 nm. Therefore, as to such coexisting PON systems, one WDM1r coupler is needed so as to enable two PON systems to coexist on the same ODN, as details are shown in FIG. 2. The design of reach extender box needs to take this demand into consideration. Those past reach extender boxes are mainly designed for a single PON system, and as to the ODN on which a plurality of PON systems coexist, the original reach extender box designed for the single PON system cannot meet the requirements of the actual application, and a combined reach extender box is needed.

SUMMARY OF THE INVENTION

The main object of the present invention is to provide a long reach optical amplification device, a passive optical network, and a method for transmitting optical signals so as to at least solve the above-mentioned problems.

A long reach optical amplification device is provided according to one aspect of the present invention, including: a first optical diplexer, a downlink optical amplifier, a second optical diplexer, and an uplink optical amplifier, wherein the first optical diplexer is configured to transmit one or multiple downlink optical signal(s) from a first segment of Feeder fiber, which is associated with passive optical networks, to the downlink optical amplifier, and couple one or multiple uplink optical signal(s) outputted by the uplink optical amplifier, which is associated with the passive optical networks, to the first segment of Feeder fiber, and the first optical diplexer has a universal interface connected to the first segment of Feeder fiber, an output terminal connected to the downlink optical amplifier, an input terminal connected to the uplink optical amplifier;

the downlink optical amplifier is configured to amplify one or multiple downlink optical signal(s) associated with the passive optical networks, and to output the amplified downlink optical signal(s) to the second optical diplexer;

the second optical diplexer is configured to couple one or multiple downlink optical signal(s) outputted by the downlink optical amplifier, which is associated with the passive optical networks, to a second segment of Feeder fiber, and transmit one or multiple uplink optical signal(s) from the second segment of Feeder fiber, which is associated with the passive optical networks, to the uplink optical amplifier; and the second optical diplexer has a universal interface connected to the second segment of Feeder fiber, an output terminal connected to the uplink optical amplifier, and an input terminal connected to the downlink optical amplifier; and the uplink optical amplifier is configured to amplify one or multiple uplink optical signal(s) associated with the passive optical networks, and to output the amplified downlink optical signal(s) to the first optical diplexer; wherein the first segment of Feeder fiber is a Feeder fiber connected between the device and an optical line termination (OLT); and the second segment of Feeder fiber is a Feeder fiber connected between the device and an optical splitter.

A passive optical network (PON) is provided according to another aspect of the present invention, including: an optical network unit, an optical distribution network, an optical line termination, and a Feeder fiber, and the above long, reach optical amplification device.

A method for transmitting optical signals is provided according to yet another aspect of the present invention implemented on the above long reach optical amplification device, including: a first optical diplexer transmitting a downlink optical signal in a first segment of Feeder fiber to a downlink optical amplifier, and a second optical diplexer transmitting an uplink optical signal in a second segment of Feeder fiber to an uplink optical amplifier; the downlink optical amplifier amplifying the downlink optical signal and outputting the amplified downlink optical signal to the second optical diplexer; the uplink optical amplifier amplifying the uplink optical signal and outputting the amplified uplink optical signal to the first optical diplexer; the first optical diplexer coupling the amplified uplink optical signal back to the first segment of Feeder fiber; and the second optical diplexer coupling the amplified downlink optical signal back to the second segment of Feeder fiber; wherein the first segment of Feeder fiber is a Feeder fiber connected between the device and an OLT; and the second segment of Feeder fiber is a Feeder fiber connected between the device and an optical splitter.

A method for transmitting optical signals is provided according to yet another aspect of the present invention, including: transmitting an uplink optical signal in a Feeder fiber to an uplink optical channel; transmitting, a downlink optical signal in the Feeder fiber to a downlink optical channel and allocating the downlink optical signal to an affiliated downlink sub-optical channel according to the wavelength of the downlink optical signal; amplifying an optical signal over the downlink sub-optical channel and the uplink optical signal respectively; and coupling the amplified optical signal over the downlink sub-optical channel hack to the downlink optical channel, then coupling the optical signal coupled back to the downlink optical channel and the uplink optical signal back to the Feeder fiber.

By way of the present invention, the uplink and downlink light are shunted and different optical amplifiers are provided over the uplink and downlink channels, which solves the long reach coexistence problem of a plurality of PON systems, thereby achieving the effects of saving costs for the operators.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention.
In the drawings.

DETAILED DESCRIPTION OF EMBODIMENTS

The present invention will be described hereinafter in detail with reference to the accompanying, drawings and in conjunction with embodiments. It needs to note that the embodiments of the present application and the features in the embodiments can be combined with each other if there is no conflict.

Embodiment One

Figure 1:
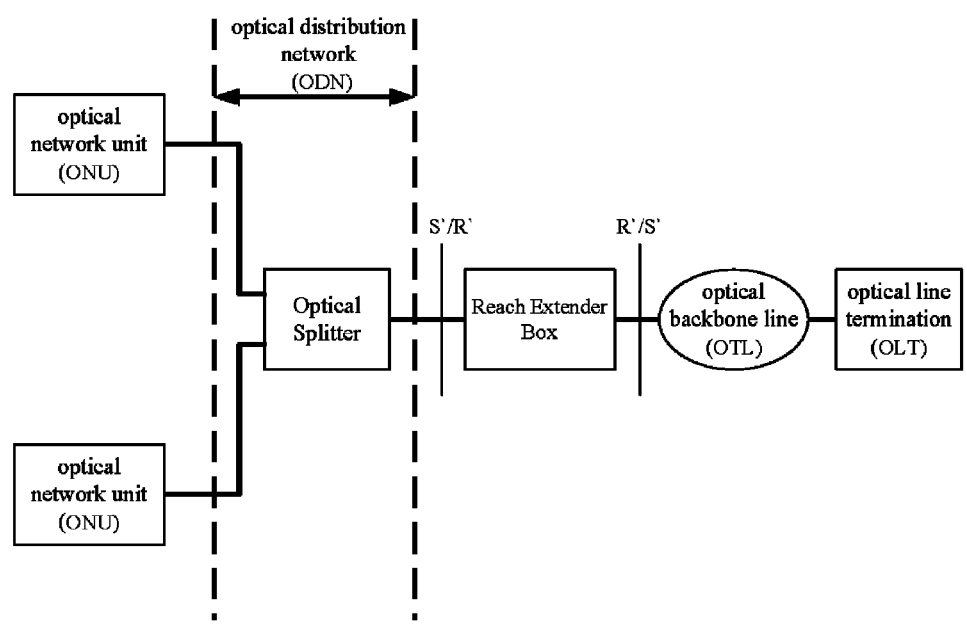
FIG. 1 is a structural schematic diagram of a long reach passive optical network according to relevant art.
Figure 2:
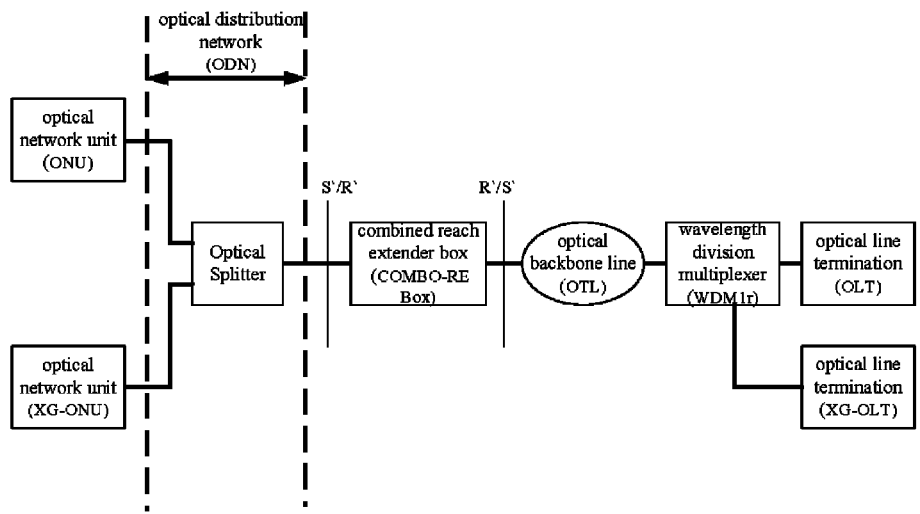
FIG. 2 is a structural schematic diagram of a coexisting long reach passive optical network according to relevant art.
Figure 3:
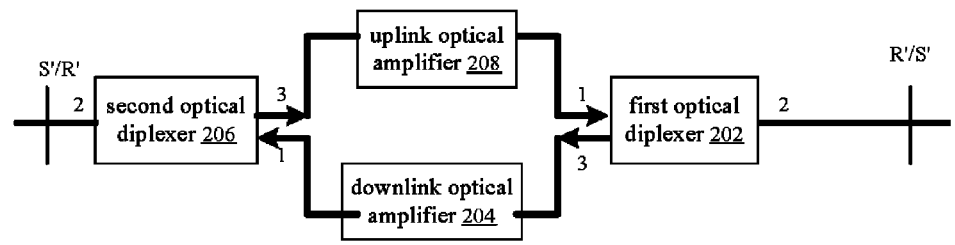
FIG. 3 is a structural block diagram of a long reach optical amplification device according to embodiment one of the present invention.

FIG. 3 is a structural block diagram of a long reach optical amplification device according to one embodiment of the present invention, and the device includes a first optical diplexer 202, a downlink optical amplifier 204, a second optical diplexer 206, and an uplink optical amplifier 208.

The first optical diplexer 202 is configured to transmit one or multiple downlink optical signal(s) from a first segment of Feeder fiber, which is associated with passive optical networks, to the downlink optical amplifier 204, and couple one or multiple uplink optical signal(s) outputted by the uplink optical amplifier 208, which is associated with the passive optical networks, to the first segment of Feeder fiber; and a universal interface of the first optical diplexer 202 is connected to the first segment of Feeder fiber, an output terminal of the first optical diplexer 202 is connected to the downlink optical amplifier 204, and an input terminal of the first optical diplexer 202 is connected to the uplink optical amplifier 208;

the downlink optical amplifier 204 is configured to amplify one or multiple downlink optical signal(s) associated with the passive optical networks; and to output the amplified downlink optical signal(s) to the second optical diplexer;

the second optical diplexer 206 is configured to couple one or multiple downlink optical signal(s) outputted by the downlink optical amplifier 204, which is associated with the passive optical networks, to a second segment of Feeder fiber; transmit one or multiple uplink optical signal(s) from the second segment of Feeder fiber, which is associated with the passive optical networks, to the uplink optical amplifier; a universal interface of the second optical diplexer 206 is connected to the second segment of Feeder fiber, an output port of the second optical diplexer 206 is connected to the uplink optical amplifier 208, and an input port of the second optical diplexer 206 is connected to the downlink optical amplifier 204; and the downlink optical amplifier 208 is configured to amplify and output one or multiple uplink optical signal(s) associated with the passive optical networks to the first optical diplexer 202;

wherein the first segment of Feeder fiber is a Feeder fiber connected from this device to an optical line termination (OLT), i.e., the Feeder fiber shown at the R'/S' interface in FIG. 3; and the second segment of Feeder fiber is a Feeder fiber connected from this device to an optical splitter, i.e., the Feeder fiber shown at the S'/R' interface in FIG. 3.

The first optical diplexer 202 is used for transmitting a downlink optical signal from the Feeder fiber to a downlink optical channel, and coupling an uplink optical signal amplified by the uplink optical amplifier 208 to the Feeder fiber;

the downlink optical amplifier 204 coupled to the first optical diplexer 202 is used for amplifying the downlink optical signal over the downlink optical channel and outputting the amplified downlink optical signal;

the second optical diplexer 206 coupled to the downlink optical amplifier 204 is used for coupling the downlink optical signal amplified by the downlink optical amplifier 204 back to the Feeder fiber; and transmitting the uplink optical signal from the Feeder fiber on R'/S' to the uplink optical channel; and the uplink optical amplifier 208 coupled to the second optical diplexer 206 and the first optical diplexer 202 is used for amplifying the uplink optical signal over the uplink optical channel and outputting the amplified uplink optical signal.

Figure 4:
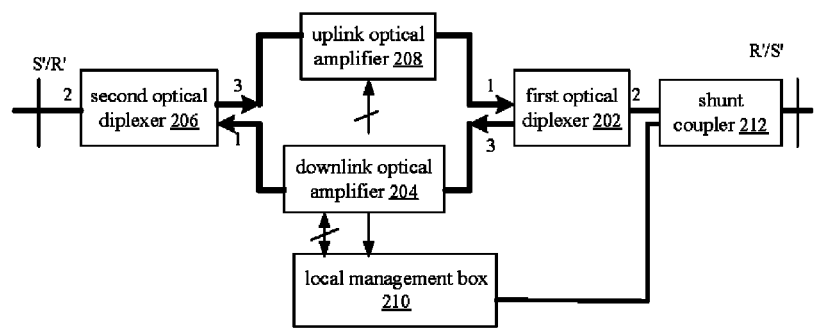
FIG. 4 is a structural block diagram of another long reach optical amplification device according to embodiment one of the present invention.

As shown in FIG. 4, the above long reach optical amplification device further includes a local management box 210 on the basis of FIG. 3 for controlling and managing the uplink optical amplifier 208 and downlink optical amplifier 204 according to the requirements of the optical line termination.

The downlink optical amplifier 204 and uplink optical amplifier 208 can be selected according to the application requirements, and in order to enable the above device to amplify any downlink optical signals, the preferred downlink optical amplifier 204 and uplink optical amplifier 208 in this embodiment are broadband semiconductor optical amplifiers (SOA). For example, the downlink optical amplifier 204 is an SOA of 100 nm, and the uplink optical amplifier 208 is an SOA of 70 nm.

The local management box 210 includes a local controller and an embedded optical network termination (EONT), and the optical line termination manages and controls the downlink optical amplifier 204 and uplink optical amplifier 208 by way of a shunt coupler 212 (such as Tap coupler) and the local management box 210.

The above device splits the uplink/downlink light by way of an optical diplexer (such as the first optical diplexer 202 and the second optical diplexer 206) so as to enable the uplink light of all the PONs to travel on the uplink optical channel and the downlink light of all the PONs to travel on the downlink light channel. An optical amplifier (such as a broadband semiconductor optical amplifier) which can amplify the uplink or downlink light of all the PONs is provided on the uplink or downlink channel, respectively, and the amplified light is coupled back to the Feeder fiber by way of the optical diplexer.

Figure 6:
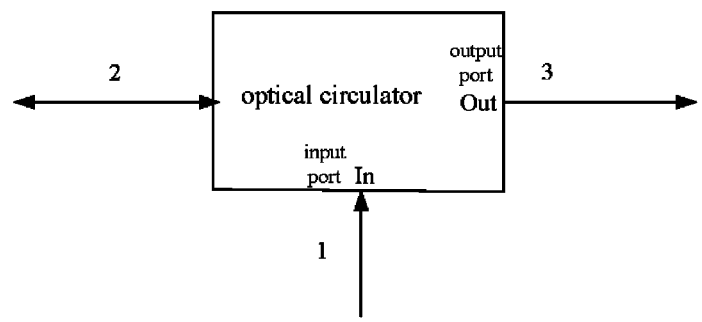
FIG. 6 is a structural block diagram of an optical circulator according to embodiment one of the present invention.

In this case, the first optical diplexer 202 and the second optical diplexer 206 can be implemented using an optical circulator. Referring to FIG. 6, it is a structural block diagram of an optical circulator provided by this embodiment, which has three ports, identified as port 1, port 2, and port 3, wherein port 1 is the entrance of light (i.e., the input port of the optical diplexer), i.e., the light can only enter this port but cannot exit, port 2 is the entrance and exit of the light (i.e., universal interface of the optical diplexer), i.e., the light can enter or exit this port, and port 3 is the exit of the light (i.e., the output port of the optical diplexer), i.e., the light can only exit but cannot enter. According to the characteristic of the optical circulator, the light can only go from port 1 to port 2, or from port 2 to port 3, and the other paths are forbidden.

In this embodiment, the optical circulator shown in FIG. 6 is used to shunt the up/downlink optical signal and transmit the shunted optical signal to the uplink optical channel and downlink optical channel, respectively, the implementation of which is simple; at the same time, by way of providing an optical amplifier on the uplink optical channel and downlink optical channel, respectively, each path of optical signal can be amplified as required, which solves the long reach coexistence problem, and it can be applied in an ODN system where the GPON and XG-PON1 coexist.

Figure 5:
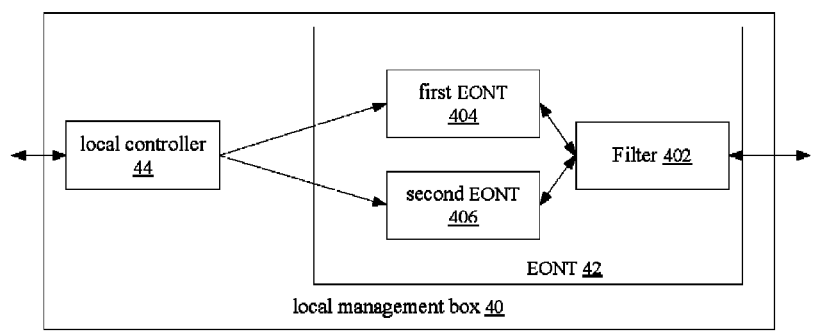
FIG. 5 is a structural block diagram of a local management box according to the present invention.

When applied in this system, the OLT controls and manages the optical amplifiers over the up/downlink channel by way of a Tap coupler and a local management box; referring to FIG. 5, the local management box 40 includes an EONT (embedded optical network termination) 42 and a local controller 44, wherein the EONT 42 is particularly comprised of a first EONT 404, a second EONT 406, and a filter 402; an instruction signal of the OLT reaches the EONT of the local management box by way of the shunt coupler, is split by the filter 402, then reaches the corresponding first EONT 404 or the second EONT 406 respectively, and then the EONT 42 transmits the relevant instruction to the local controller 44, the local controller 44 manages and controls the long reach amplification device according to the instruction and finally feeds back the result to the EONT 42; according to different PON system signals, the feedback information is sent to a corresponding OLT by the corresponding first EONT or second EONT thereof, the interface of the corresponding filter thereof, the shunt coupler and the Feeder fiber. The implementation of EONT belongs to the well-known technology for those skilled in the art, which will not be described here redundantly, and its particular embodiments are not intended to limit the scope of protection of the present invention.

Embodiment Two

Figure 7:
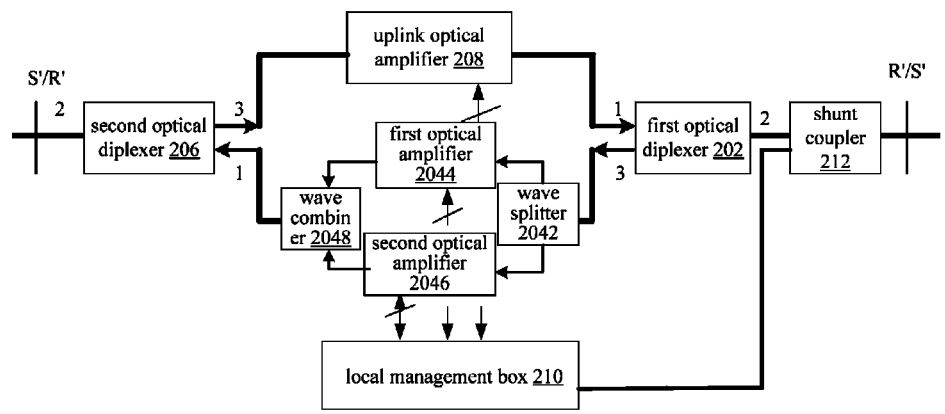
FIG. 7 is a structural block diagram of a long reach optical amplification device according to embodiment two of the present invention.

FIG. 7 shows a structural block diagram of a long reach optical amplification device according to one embodiment of the present invention, and the device includes a first optical diplexer 202, a downlink optical amplifier 204, a second optical diplexer 206, an uplink optical amplifier 208, and a local management box 210. Among them, the downlink optical amplifier 204 includes:

a wave splitter 2042 being configured to split the downlink optical signal(s) into two paths according to wavelengths of the downlink optical signal(s), with one path being transmitted to a first downlink channel and the other path to a second downlink channel; a first optical amplifier 2044 being configured to amplify the downlink optical signal at the first downlink channel and output the amplified first downlink optical signal; a second optical amplifier 2046 being configured to amplify the downlink optical signal at the second downlink channel and output the amplified second downlink optical signal; a wave combiner 2048 being configured to combine the first downlink optical signal(s) outputted by the first optical amplifier 2044 and the second downlink optical signal(s) outputted by the second optical amplifier 2046 into an amplified downlink optical signal and output the amplified downlink optical signal to the downlink optical channel.

In this case, the wave splitter 2042 is a wavelength division multiplexing filter for splitting the downlink optical signal according to the wavelength thereof onto a corresponding optical amplifier, and the light amplified by the optical amplifier is coupled to the downlink optical channel by way of a wave combiner 2048 (wavelength division multiplexing filter) and then back to the Feeder fiber by way of the second optical diplexer 206.

In this case, the local management box is comprised of an EONT and a local controller, and referring to FIG. 5, the OLT reaches the EONT of the local management box by way of the shunt coupler 212, is split by the filter, then reaches the corresponding first EONT or second EONT respectively, and then the EONT transmits the relevant instruction to the local controller which manages and controls the up/downlink optical amplifier according to the instruction, finally the result is fed back to the EONT, and according to different PON system signals, the feedback information is sent to the corresponding OLT by the corresponding first EONT or second EONT thereof, the interface of the filter, the shunt coupler and the Feeder fiber.

Figure 8:
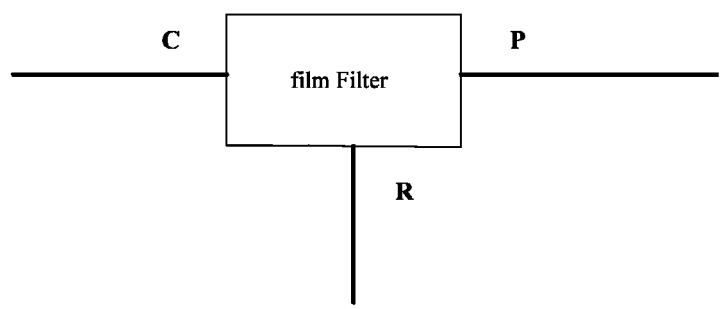
FIG. 8 is a structural block diagram of a film filter according to embodiment two of the present invention.

Referring to FIG. 8, it is structural block diagram of a film filter provided by this embodiment, which has two typos of bandwidth filter and sideband filter. In this embodiment, a sideband filter is mainly used by the above wave combiner 2048 or wave splitter 2042. This film filter has three ports, identified as port C, port R, and port P. Among, them, port C is a universal port, i.e., light of any wavelengths can enter or exit this port; port P is a transmission port, i.e., only the light that passes through the transmission window of the filter can enter or exit this port; and port R is a reflection port, i.e., only the light that passes through the reflection window of the filter can enter or exit this port. If the light enters from port C and is outputted from ports P and R according to different wavelengths, which is exactly a wave splitter, vice versa, if light of different wavelengths enters from ports P and R respectively and is outputted from port C, which is exactly a wave combiner.

This embodiment is similar to embodiment one, which is also by way of the optical diplexer, i.e., the optical circulator shunts the up/downlink light to enable the uplink light of all the PONs to travel on the uplink optical channel and the downlink light of all the PONs to travel on the downlink optical channel. The difference between this embodiment and Embodiment One lies in that a broadband semiconductor optical amplifier is provided over the uplink optical channel, for example, the uplink optical amplifier is a broadband semiconductor optical amplifier of 70 nm; while over the downlink optical channel, the broadband SOA is replaced with two ordinary SOAs, for example, both the first optical amplifier 2044 and second optical amplifier 2046 are SOAs of 30 nm.

In this embodiment, by way of using two narrowband optical amplifiers for the downlink optical signal to amplify downlink optical signals of different wavelengths, the implementation thereof is relatively easy, and the operators can use a device provided by this embodiment to solve the long reach coexistence problem of a plurality of PONs.

Embodiment Three

Figure 9:
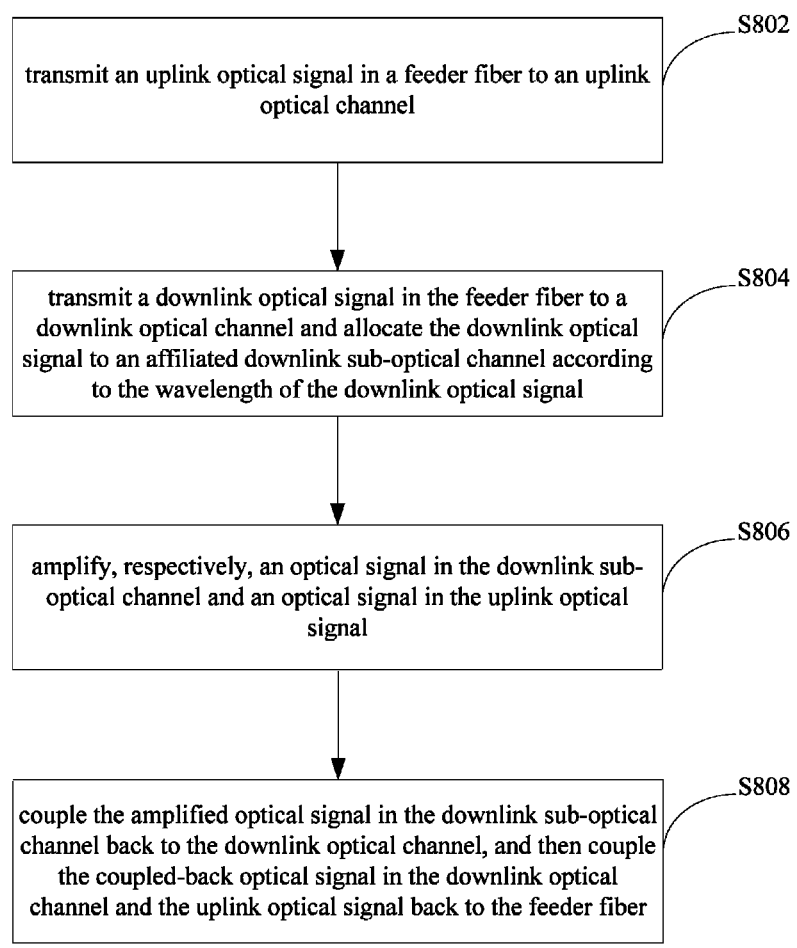
FIG. 9 is a flowchart of a method for transmitting optical signals according to embodiment three of the present invention.

This embodiment provides a method for transmitting optical signals, and referring to FIG. 9, it is a flowchart of the method for transmitting optical signals provided by this embodiment, which method includes:

Step S802: transmit an uplink optical signal in a Feeder fiber to an uplink optical channel;

Step S804: transmit a downlink optical signal in the Feeder fiber to a downlink optical channel and allocate the downlink optical signal to an affiliated downlink sub-optical channel according to the wavelength of the downlink optical signal;

Step S806: amplify an optical signal over the downlink sub-optical channel and the uplink optical signal respectively; and Step S808: couple the amplified optical signal over the downlink sub-optical channel to the downlink optical channel, then coupling the amplified optical signal in the downlink optical channel and the uplink optical signal to the Feeder fiber.

Hereinafter, the long reach optical amplification device provided by embodiment one implementing the above method will be taken as an example for description, wherein the method for transmitting downlink optical signals includes: transmitting a downlink optical signal from the Feeder fiber to a downlink optical channel by way of the first optical diplexer 202; amplifying the downlink optical signal over the downlink optical channel by way of the downlink optical amplifier 204 and outputting the amplified downlink optical signal; and coupling the amplified downlink optical signal back to the Feeder fiber by way of the second optical diplexer 206;

the method for transmitting uplink optical signals includes: transmitting an uplink optical signal from the Feeder fiber to an uplink optical channel by way of the second optical diplexer 206; amplifying the uplink optical signal over the uplink optical channel by way of the uplink optical amplifier 208 and outputting the amplified uplink optical signal; and coupling the uplink optical signal amplified by the uplink optical amplifier 208 back to the Feeder fiber by way of the first optical diplexer 202;

the local management box 210 controls and manages the uplink optical amplifier 208 and downlink optical amplifier 204 according to the requirements of the optical line termination so as to enable the downlink optical amplifier 204 and uplink optical amplifier 208 to amplify the downlink optical signal and uplink optical signal respectively.

In this embodiment, by way of splitting the optical signal in the Feeder fiber, the optical signal can be amplified by way of different optical channels, which meets the requirements of coexisting passive optical network.

The long reach optical amplification device provided by the above embodiments one and two can be applied in the coexisting passive optical network, and hereinafter, an ODN system where GPON and XG-PON1 coexist will be taken as an example to list two application embodiments.

Embodiment Four

In this embodiment, the long reach optical amplification device provided by embodiment one is applied in an optical distribution network of a coexisting, passive optical network, wherein the coexisting passive optical network is described by taking GPON and XG-PON1 being, coexisted as an example, the downlink wavelength of GPON is 1480 nm-1500 nm, and the uplink wavelength thereof is 1290 nm-1330 nm; the downlink wavelength of XG-PON1 is 1575 nm-1580 nm, and the uplink wavelength thereof is 1260 nm-1280 nm. The work procedure of the long, reach optical amplification device is as follows:

the downlink optical signals sent by the OUT of GPON and the OLT of XG-PON reach port 2 of the first optical diplexer 202 in the long reach optical amplification device, i.e., light entrance and exit, directed to port 3, i.e., light exit, then enter the downlink optical channel. Then, it is amplified by the downlink optical amplifier 204, since the video signal is of 1550 nm-1560 nm and the downlink signal of XG-PON is 1575 nm-1580 nm, the downlink optical amplifier 204 in this embodiment uses a 100 nm ultra-bandwidth SOA from 1480 nm to 1580 nm; this SOA can amplify these signals simultaneously; then the amplified, signals reach port 1 of the second optical diplexer 206, i.e., light entrance, directed to port 2, then return to the Feeder fiber.

The uplink light sent by the ONU of GPON and the ONU of XG-PON is focused to port 2 of the second optical diplexer 206 in the long reach optical amplification device, i.e., light entrance and exit, directed to port 3, i.e., light exit, then enters the uplink optical channel. Then, it is amplified by the uplink optical amplifier 208, and the uplink optical amplifier 208 in this embodiment is a 70 nm broadband SOA from 1.260 nm to 1330 nm, and this amplified optical signal reaches port 1 of the first optical diplexer 202; i.e., light entrance, directed to port 2, then returns to the Feeder fiber.

The instruction signal of the OLT reaches the EONT of the local management box by way of the Tap coupler, split by the filter, then reaches the corresponding first EONT or second EONT, then the EONT transfers the relevant instruction to the local controller, manages and controls the up/downlink SOA amplification device according to the instruction, and finally feeds back the result to the EONT; according to different PON system signals, the feedback information is sent to the corresponding OLT by the corresponding first EONT or second EONT thereof, the interface of the corresponding filter thereof, the shunt coupler and the Feeder fiber.

In this embodiment, the optical signals in two PON networks can be amplified by applying a long reach optical amplification device in the ODN system where GPON and XG-PON1 coexist, and its implementation is simple, which meets the requirements of actual application.

Embodiment Five

In this embodiment, the long reach optical amplification device provided by embodiment two is applied in an optical distribution network of a coexisting passive optical network, wherein the coexisting passive optical network is illustrated with an ODN system including coexisting GPON and XG-PON1 as an example. The workflow of the long, reach optical amplification device in this embodiment is as follows:

the downlink light sent by the OLT of GPON and the OLT of XG-PON reaches port 2 of the first optical diplexer 202 in the long reach optical amplification device, i.e., the light entrance and exit port, and is directed to port 3, i.e., the light exit port, and then enters the downlink optical channel. Then it passes through a wave splitter 2042, i.e., port C of the sideband filter, which filter transmits all the light above 1540 nm and reflects all the light below 1540 nm. According to this characteristic, the downlink light of the GPON is directed to the first downlink channel, i.e., the reflection channel, and then amplified by the first optical amplifier 2044, and the first optical amplifier 2044 in this embodiment is an SOA with the amplification bandwidth thereof being at least from 1480 nm to 1500 nm, and then reaches port R of the wave combiner 2048; while the downlink light of the XG-PON1 is directed to the second downlink channel, i.e., the transmission channel, and then passes through the second optical amplifier 2046, and the second optical amplifier 2046 in this embodiment is an SOA with the amplification bandwidth thereof being at least from 1550 nm to 1580 nm; since the video signal is of 1550 nm-1560 nm and the downlink signal of XG-PON is of 1575 nm-1580 nm, the two SOAs in this embodiment can amplify these signals simultaneously.

Then, the amplified light reaches port P of the wave, combiner 2048, and the amplified, light of these two channels passes through ports R and P of the wave combiner 2048 and is outputted from port C of the wave combiner 2048 after being combined, returns to the downlink optical channel, then reaches port 1 of the second optical diplexer 206, i.e., the light entrance, directed to port 2, and returns back to the Feeder fiber.

The uplink optical signals sent by the ONU of GPON and the ONU of XG-PON are focused to port 2 of the second optical diplexer 206 in the long reach optical amplification device, i.e., light entrance and exit, directed to port 3, i.e., light exit, then enters the uplink optical channel. Then, it is amplified by the uplink optical amplifier 208, and the uplink optical amplifier 208 in this embodiment is a 70 nm broadband SOA from 1260 μm to 1330 nm, and this amplified optical signal reaches port 1 of the first optical diplexer 202, i.e., light entrance, directed to port 2, then returns to the Feeder fiber.

The OLT in this embodiment reaches the EONT of the local management box by way of the Tap coupler, split by the filter, then reaches the corresponding first EONT or second EONT, then the EONT transfer the relevant instruction to the local controller, manages and controls the up/downlink SOA amplification device according to the instruction, and finally feeds back the result to the EONT; according, to different PON system signals, the feedback information is sent to the corresponding OLT by the corresponding first EONT or second EONT thereof, the interface of the corresponding filter thereof, the shunt coupler and the Feeder fiber.

It can be known from the above disclosure that a 100 nm ultra-broadband SOA is needed in embodiment three and only two 30 nm narrowband SOAs are needed in this embodiment. The user can select a corresponding solution according to the currently available production process. However, every solution can meet the long reach coexistence of two PON systems, especially the long reach coexistence of GPON and XG-PON1, and solve the long reach coexistence problem of a plurality of PON systems for the operators. Since the long reach optical amplification device is optimized and designed as a whole, the costs are not increased as compared to the reach extender box of the single PON system, saving costs for the operators.

It can be seen from the above description that the present invention achieves the following technical effects; in the above embodiments, the long reach coexistence problem of a plurality of PON systems are solved for the operators by way of shunting the uplink and downlink light and providing different optical amplifiers over the uplink and downlink channels. Since the long reach optical amplification device is optimized and designed as a whole, the costs are not increased as compared to the reach extender box of the single PON system, saving costs for the operators.

Above description is only to illustrate the preferred embodiments but not to limit the present invention. Various alternations and changes to the present invention are apparent to those skilled in the art. The scope defined in claims shall comprise any medication, equivalent substitution and improvement within the spirit and principle of the present invention.

What is claimed is:

1. A long reach optical amplification device, comprising a first optical diplexer, a downlink optical amplifier, a second optical diplexer, and an uplink optical amplifier, wherein the first optical diplexer is configured to transmit one or multiple downlink optical signal(s) from a first segment of Feeder fiber, which is associated with passive optical networks, to the downlink optical amplifier, and couple one or multiple uplink optical signal(s) outputted by the uplink optical amplifier, which is associated with the passive optical networks, to the first segment of Feeder fiber; and the first optical diplexer has a universal interface connected to the first segment of Feeder fiber, an output terminal connected to the downlink optical amplifier, an input terminal connected to the uplink optical amplifier;

the downlink optical amplifier is configured to amplify one or multiple downlink optical signal(s) associated with the passive optical networks, and to output the amplified downlink optical, signal(s) to the second optical diplexer;

the second optical diplexer is configured to couple one or multiple downlink optical signal(s) outputted by the downlink optical amplifier, which is associated with the passive optical networks, to a second segment of Feeder fiber, and transmit one or multiple, uplink optical signal (s) from the second segment of Feeder fiber, which is associated with the passive optical networks, to the uplink optical amplifier; and the second optical diplexer has a universal interface connected to the second segment of Feeder fiber, an output terminal connected to the uplink optical amplifier, and an input terminal connected to the downlink optical amplifier; and the uplink optical amplifier is configured to amplify one or multiple uplink optical signal(s) associated with the passive optical networks, and to output the amplified uplink optical signal(s) to the first optical diplexer;

wherein the first segment of Feeder fiber is a Feeder fiber connected between the device and an optical line termination (OLT); and the second segment of Feeder fiber is a Feeder fiber connected between the device and an optical splitter;

wherein the device further corn rises a local management box which controls and manages the uplink optical amplifier and the downlink optical amplifier according to requirements of the optical line termination;

wherein the local management box comprises a local controller and an embedded optical network termination (EONT), wherein the optical line termination manages and controls the downlink optical amplifier and the uplink optical amplifier by way of a shunt coupler and the local management box.

2. The device according to claim 1, wherein the downlink optical amplifier is a semiconductor optical amplifier having a bandwidth equal to or greater than 100 nm, and the uplink optical amplifier is a semiconductor optical amplifier having a bandwidth equal to or greater than 70 nm.

3. The device according to claim 1, wherein the uplink optical amplifier is a semiconductor optical amplifier having a bandwidth equal to or greater than 70 nm, and
the downlink optical amplifier comprises:
a wave splitter being configured to split the downlink optical signal(s) into two paths according to wavelengths of the downlink optical signal(s), with one path being transmitted to a first optical amplifier and the other path to a second optical amplifier;
the first optical amplifier being configured to amplify and output the downlink optical signal received by the first optical amplifier as a first downlink optical signal:
the second optical amplifier being configured to amplify and output the downlink optical signal received by the second optical amplifier as a second downlink optical signal; and
a wave combiner being configured to combine the first downlink optical signal(s) outputted by the first optical amplifier and the second downlink optical signal(s) outputted by the second optical amplifier into an amplified downlink optical signal and output the amplified downlink optical signal to the second optical diplexer.

4. The device according to claim 3, wherein both the first optical amplifier and second optical amplifier are semiconductor optical amplifiers having a bandwidth equal to or greater than 30 nm.

5. The device according to claim 3, wherein both the wave splitter and the wave combiner are wavelength division multiplexing film filter.

6. A method for transmitting optical signals, implemented by a long reach optical amplification device as claimed in claim 1, comprising:
a first optical diplexer transmitting a downlink optical signal in a first segment of Feeder fiber to a downlink optical amplifier, and a second optical diplexer transmitting an uplink optical signal in a second segment of Feeder fiber to an uplink optical amplifier;
the downlink optical amplifier amplifying the downlink optical signal and outputting the amplified downlink optical signal to the second optical diplexer;
the uplink optical amplifier amplifying the uplink optical signal and outputting the amplified uplink optical signal to the first optical diplexer;
the first optical diplexer coupling the amplified uplink optical signal back to the first segment of Feeder fiber; and
the second optical diplexer coupling the amplified downlink optical signal back to the second segment of Feeder fiber;
wherein the first segment of Feeder fiber is a Feeder fiber connected between the device and an optical line termination (OLT); and the second segment of Feeder fiber is a Feeder fiber connected between the device and an optical splitter.

7. The method according to claim 6, wherein during a process of the downlink optical amplifier amplifying the downlink optical signal and the uplink optical amplifier amplifying the uplink optical signal, further comprising:
a local management box controlling and managing the uplink optical amplifier and the downlink optical amplifier according to requirements of the optical line termination so as to enable the downlink optical amplifier to amplify the downlink optical amplifier and enable the uplink optical amplifier to amplify the uplink optical signal.

8. A method for transmitting optical signals, comprising:
transmitting an uplink optical signal in a Feeder fiber to an uplink optical channel;
transmitting a downlink optical signal in the Feeder fiber to a downlink optical channel and allocating the downlink optical signal to an affiliated downlink sub-optical channel according to the wavelength of the downlink optical signal;
amplifying an optical signal over the downlink sub-optical channel and the uplink optical signal respectively;
coupling the amplified optical signal over the downlink sub-optical channel back to the downlink optical channel, then coupling the coupled-back optical signal in the downlink optical channel and the uplink optical signal back to the Feeder fiber, wherein the amplifying is controlled and managed by a local management box according to requirements of an optical line termination; and
the local management box comprises a local controller and an embedded optical network termination (EONT), wherein the optical line termination manages and controls the amplifying b way of a shunt coupler and the local management box.

* * * * *